Feb. 27, 1945.　　A. F. BENNETT ET AL　　2,370,222
DRIVING AND CONTROL MECHANISM
Filed June 22, 1942　　9 Sheets-Sheet 1
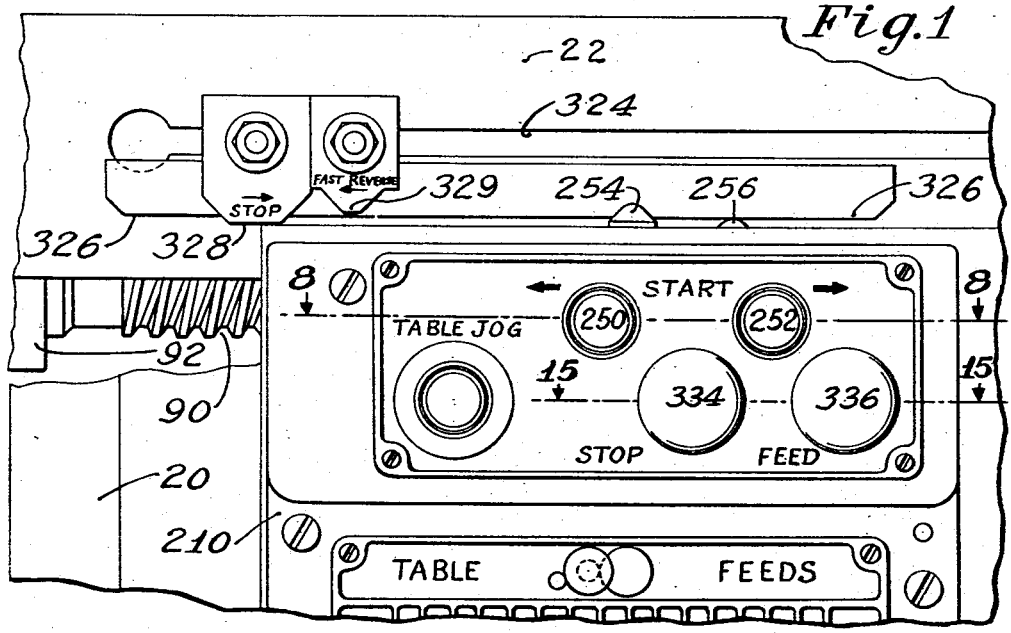
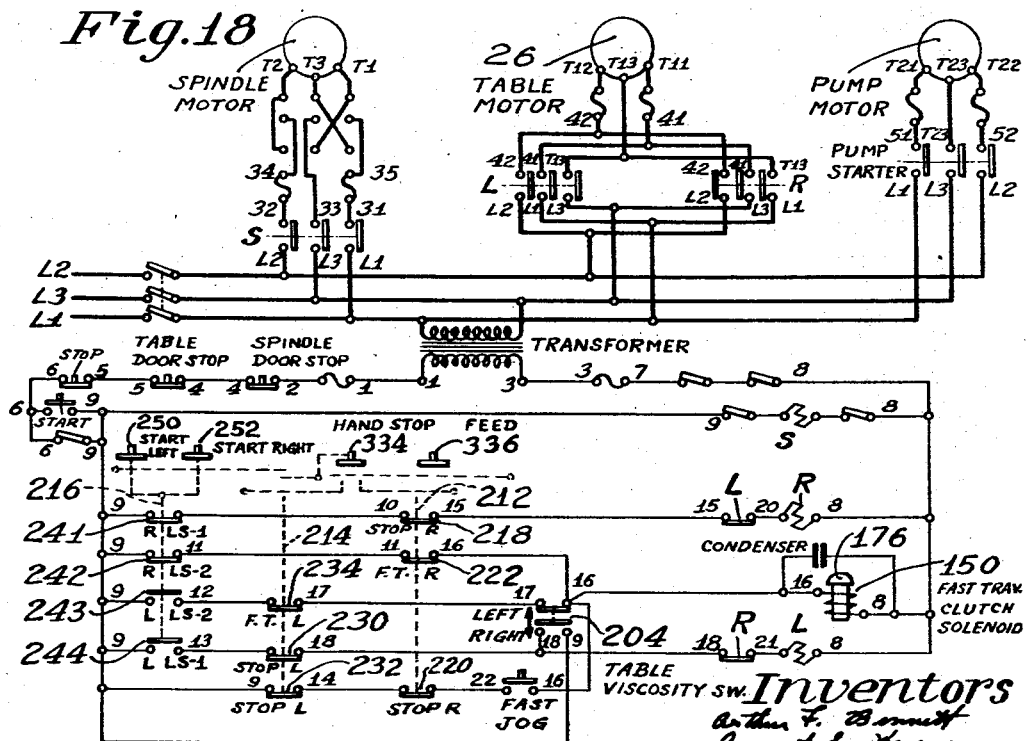

Feb. 27, 1945. A. F. BENNETT ET AL 2,370,222
DRIVING AND CONTROL MECHANISM
Filed June 22, 1942 9 Sheets-Sheet 2
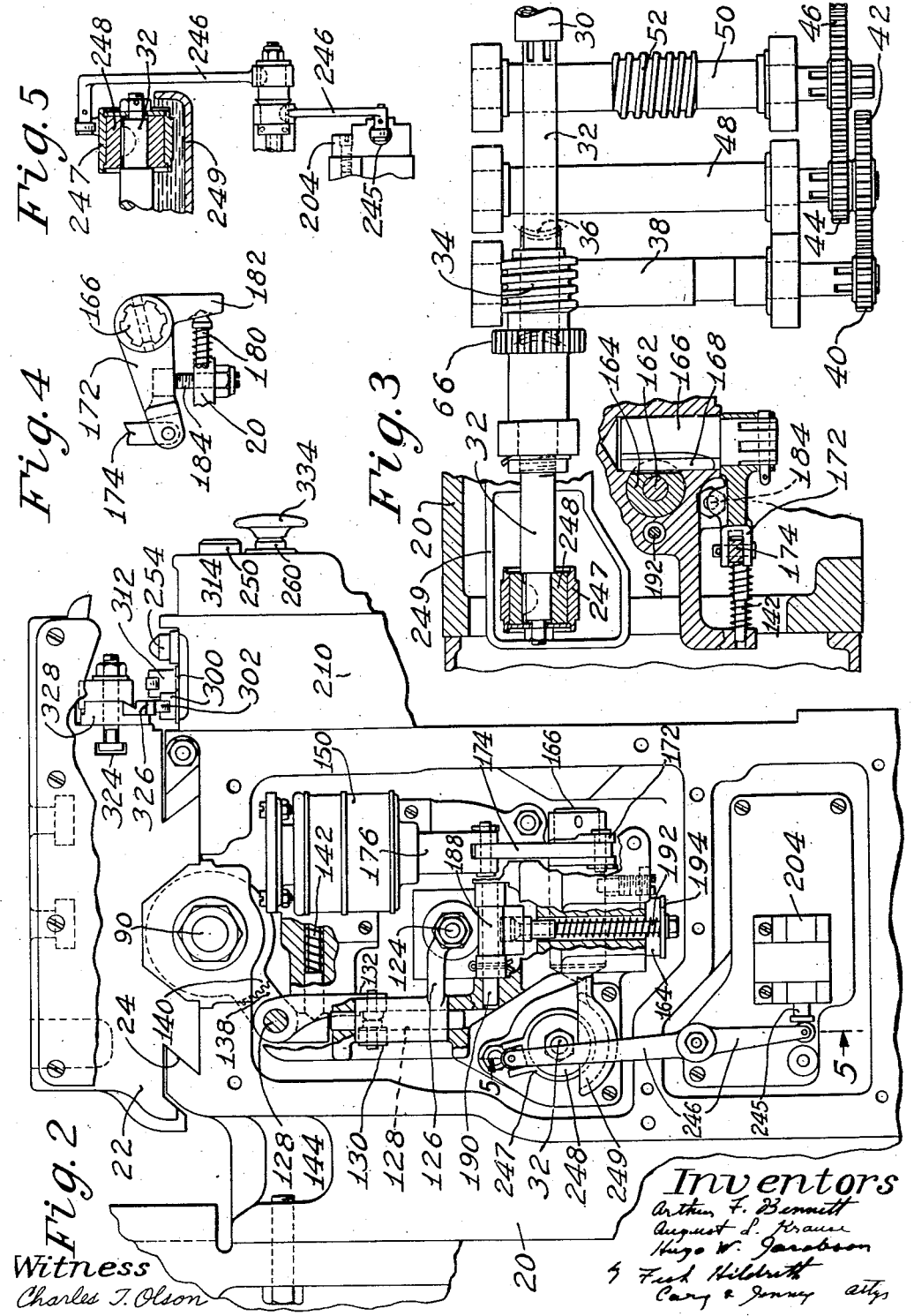

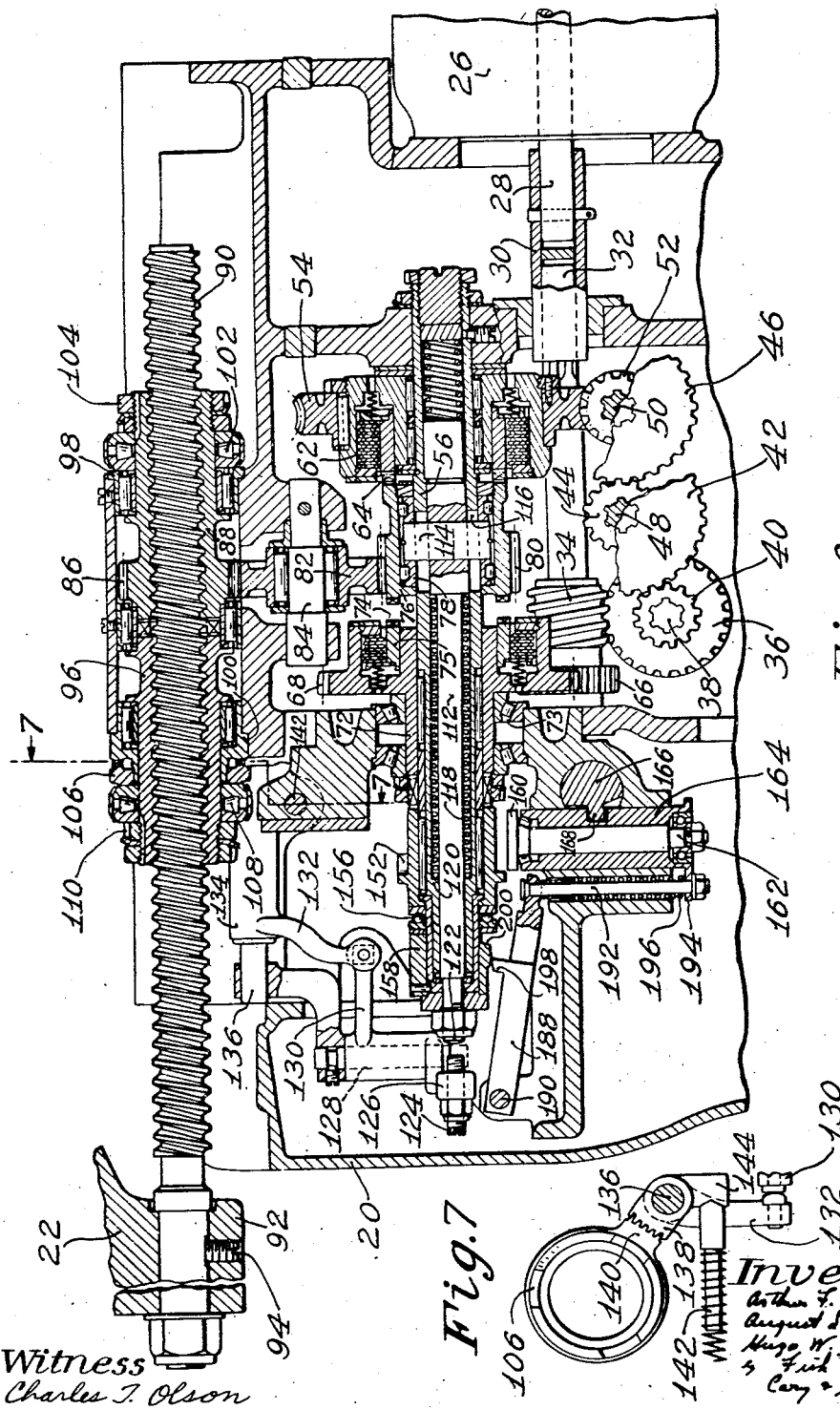

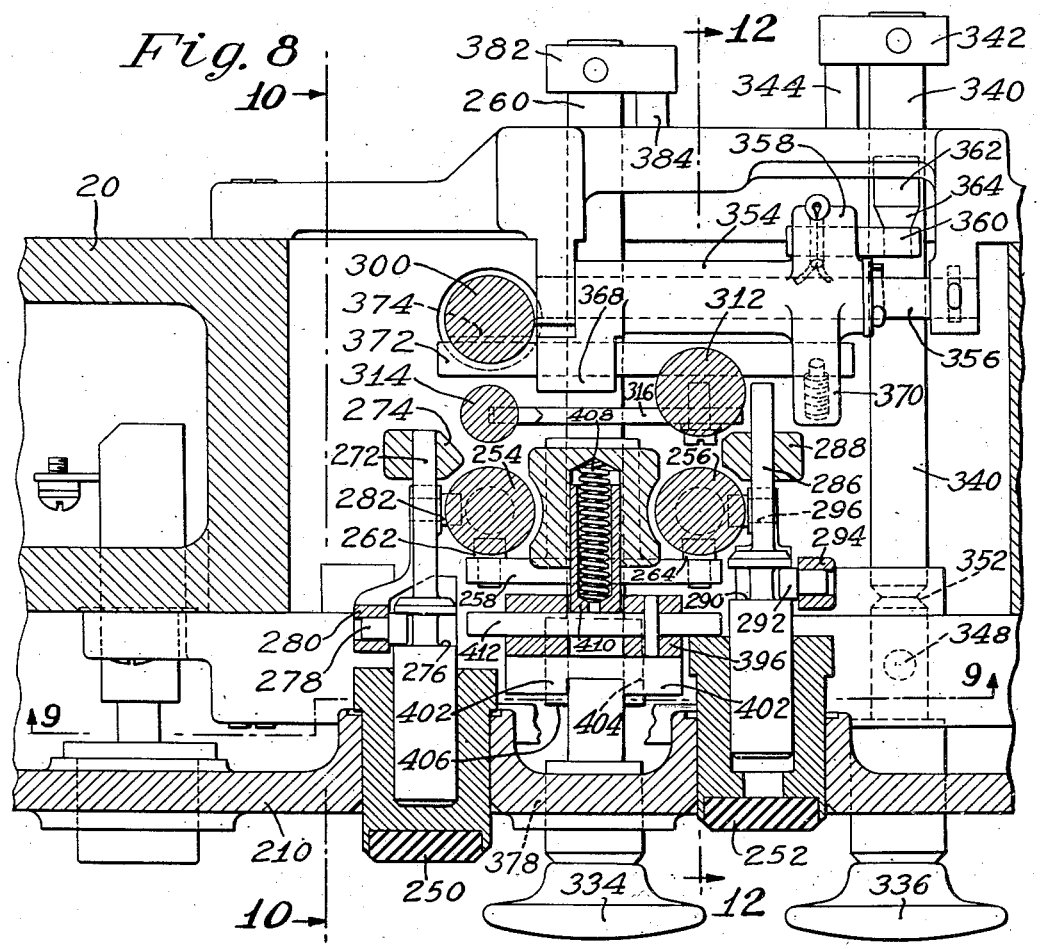
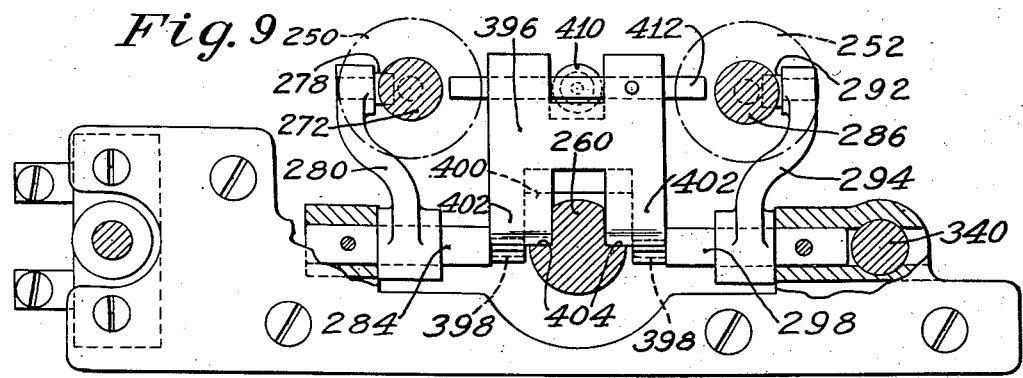

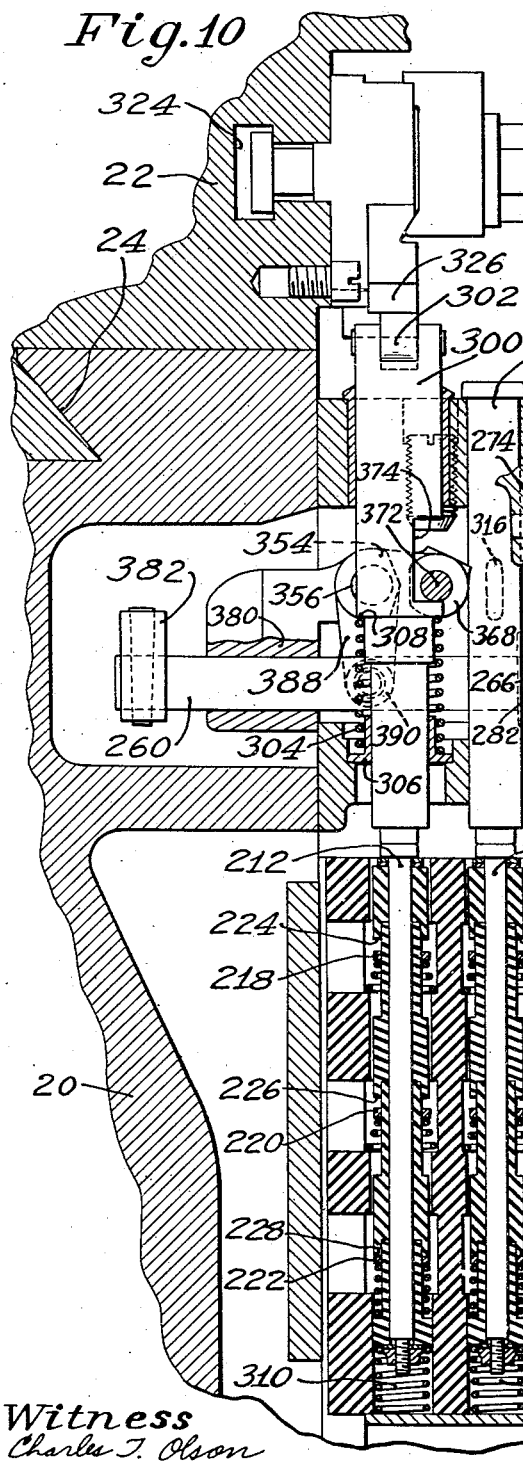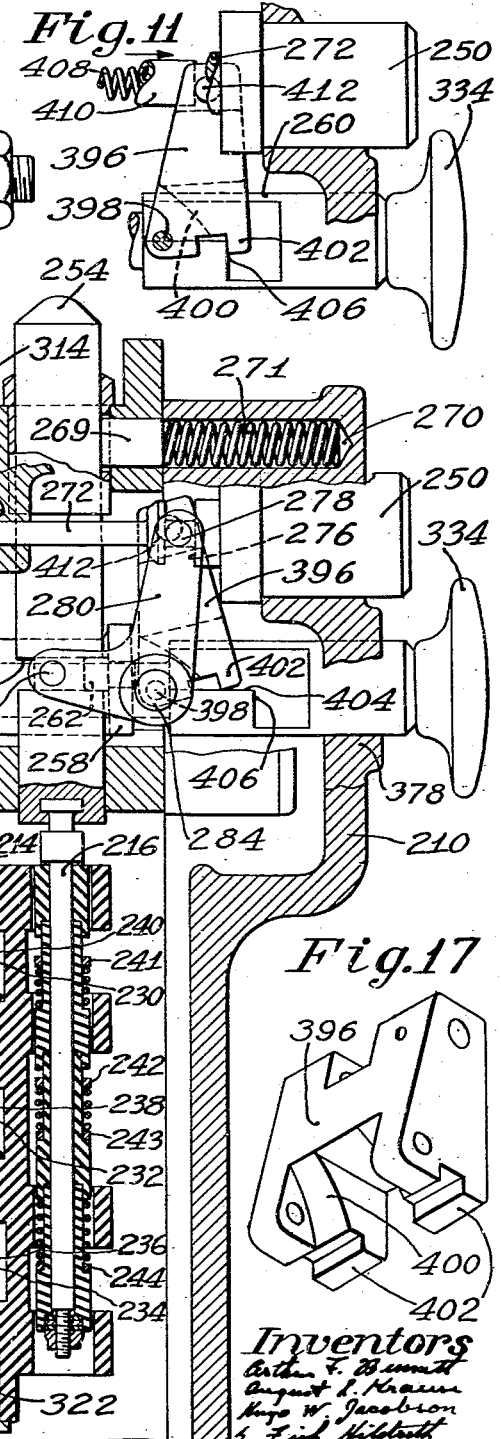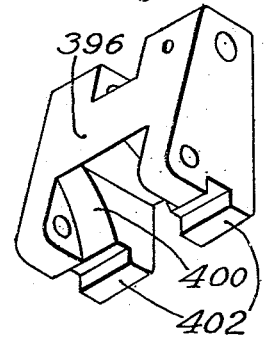

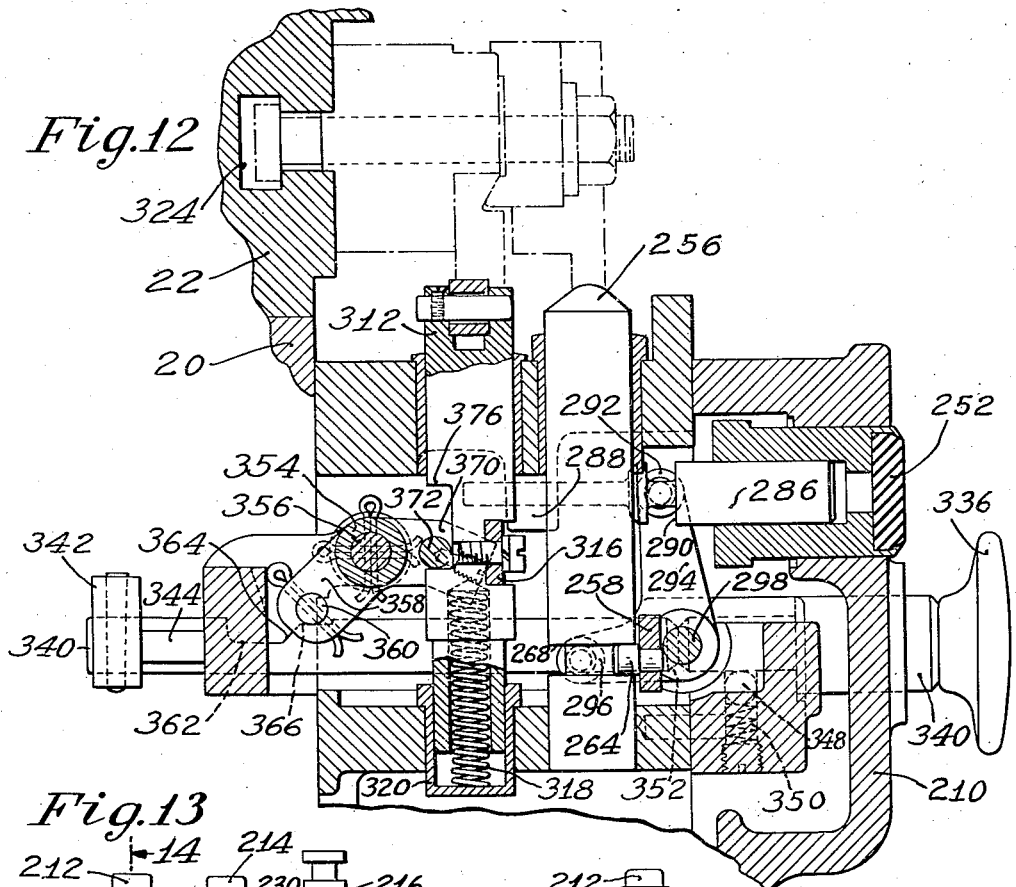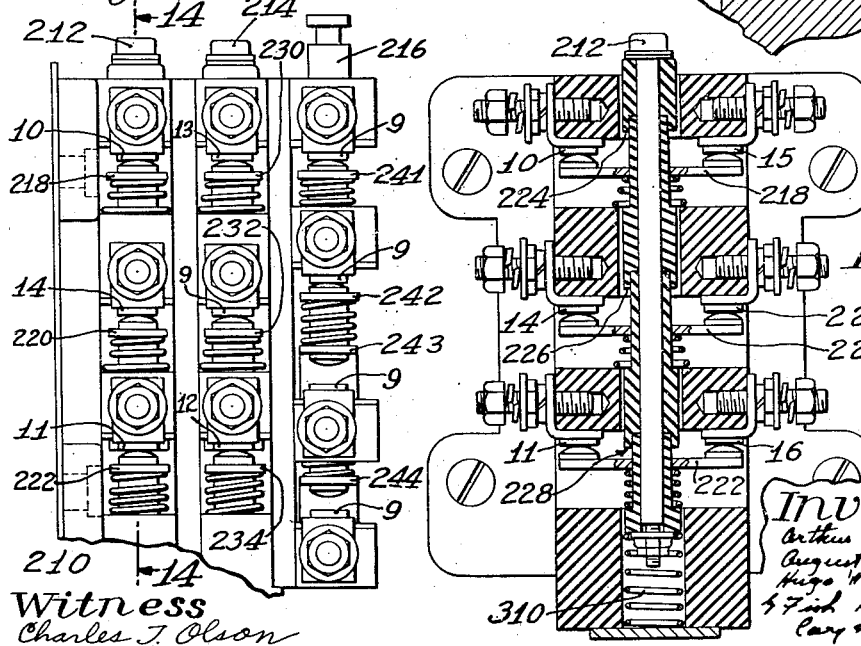

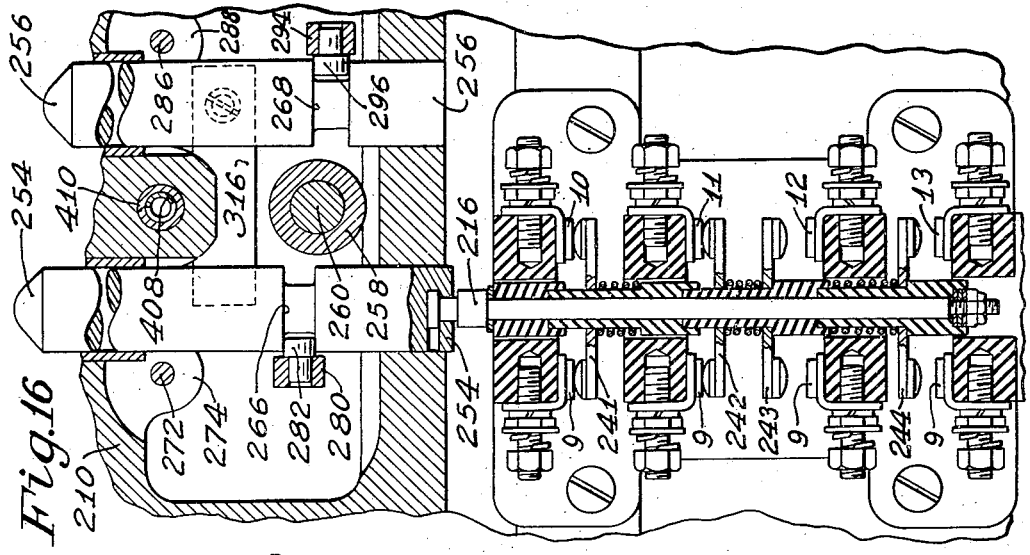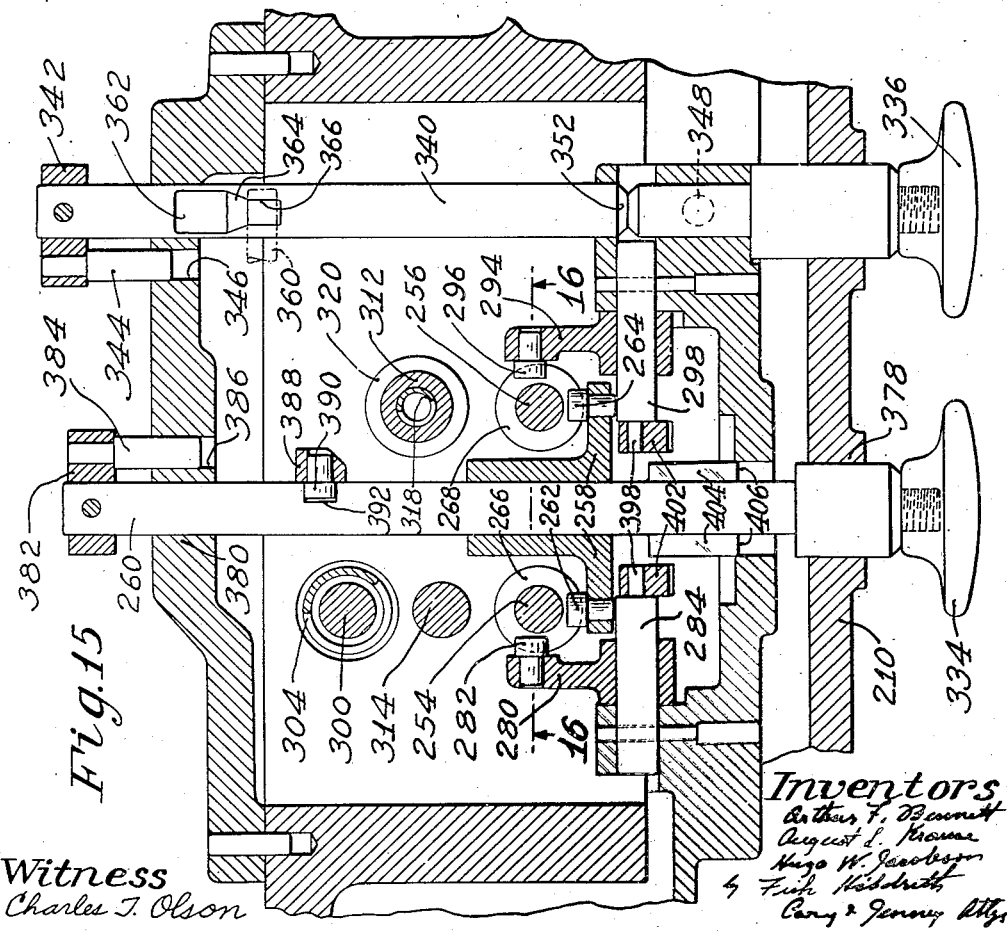

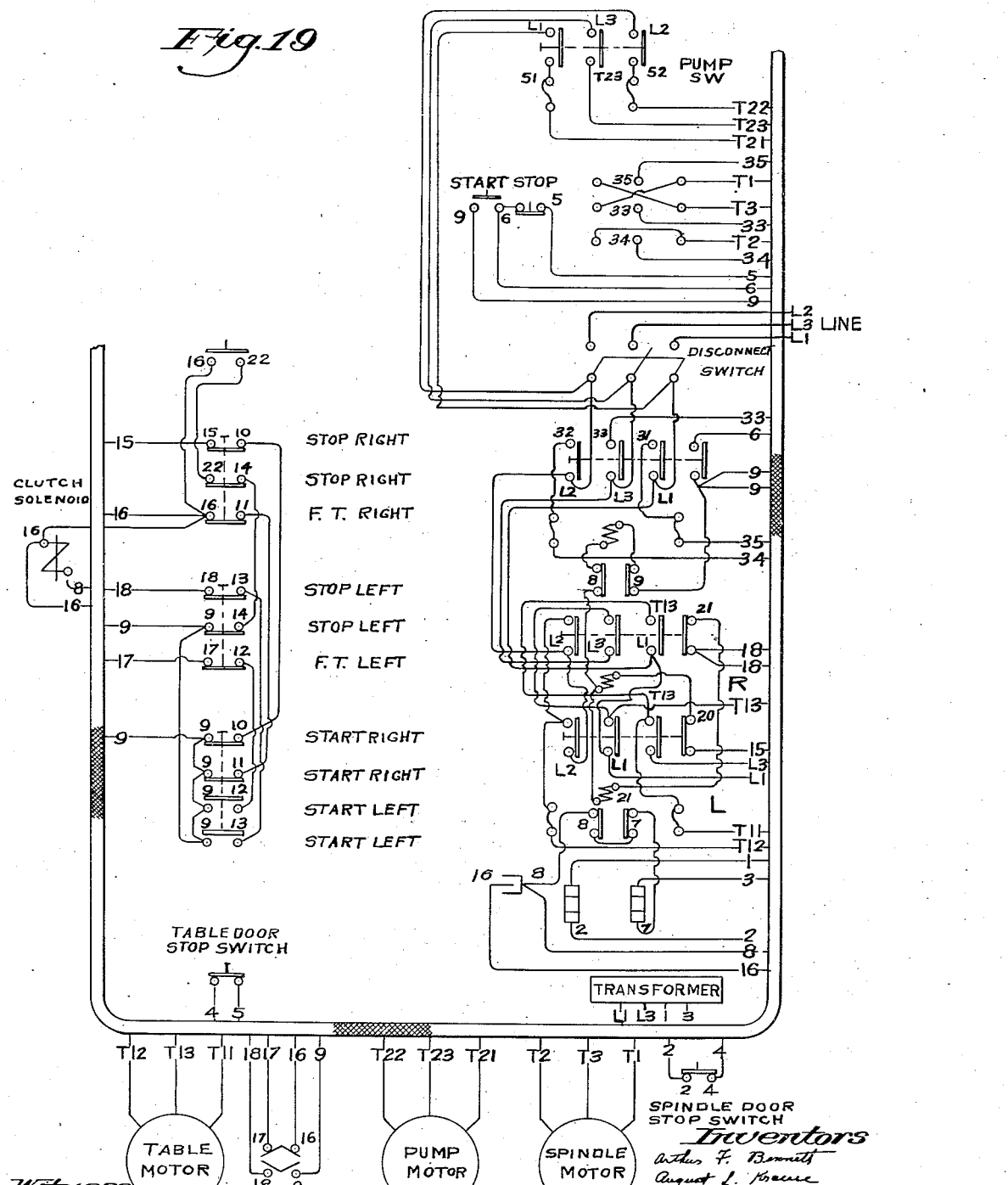

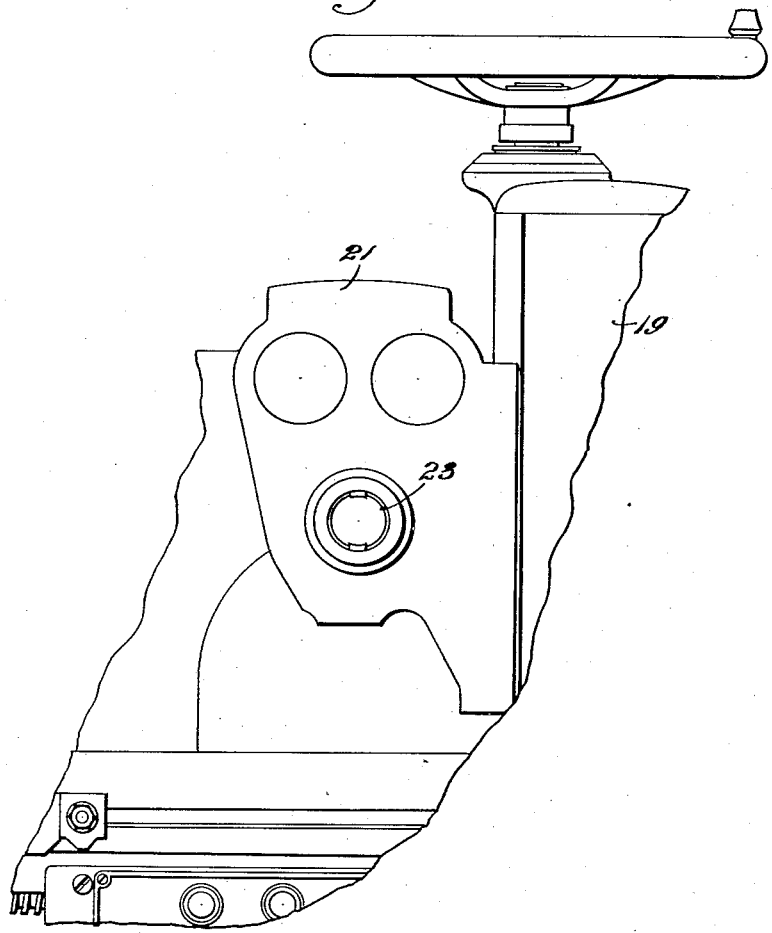

Patented Feb. 27, 1945

2,370,222

UNITED STATES PATENT OFFICE 2,370,222

DRIVING AND CONTROL MECHANISM

Arthur F. Bennett, West Barrington, and August L. Krause, and Hugo W. Jacobson, Providence, R. I., assignors to Brown and Sharpe Manufacturing Company, a corporation of Rhode Island Application June 22, 1942, Serial No. 447,931

20 Claims. (Cl. 90—21)

The present invention relates to improvements in machine tools, and more particularly to improvements in a driving and control mechanism for a movable support in that class of tools which include a support mounted on ways for movement to effect a relative feed and return movement of the work and operating tool.

The invention is herein disclosed as embodied in a milling machine of the general type illustrated, for example, in the patent to Graves and Bennett No. 2,077,408, which comprises a rotary milling cutter adjustably supported on a machine column, a reciprocable work supporting table, and electrically operated driving connections including a spindle driving motor, a reversible table driving motor, and variable speed feed and quick traverse driving connections from the motor to the table including a solenoid operated feed-quick traverse clutch.

In machines of this general description equipped with electrically operated devices for driving and for controlling the operation of the several cooperating mechanisms of the machine, electrical control systems of considerable complexity have been employed to coordinate and control the operation of the several mechanisms for manual and for automatic operation under the great variety of operating conditions encountered in commercial use.

It is a principal object of the present invention to provide in a machine of this general description, a novel and improved control system for the machine which includes a substantially simplified construction and arrangement of the several operating electrical circuits, and a novel and improved system of mechanical control devices associated therewith including both manual and dog actuated controls.

With these and other objects in view as may hereinafter appear, the several features of the invention consist in the devices, combinations and arrangement of parts hereinafter described and claimed, which together with the advantages to be obtained thereby will be readily understood by one skilled in the art from the following description taken in connection with the accompanying drawings, in which Fig. 1 is a fragmentary view in front elevation illustrating particularly the control panel for the work table of a milling machine, only so much of the machine having been shown as is believed necessary to illustrate the connection of the present invention therewith; Fig. 2 is a detail view of the base and work table of the machine in left side elevation, the end plate of the base having been removed and certain parts shown in section for clarity of illustration; Fig. 3 is a fragmentary plan view partly in section, illustrating particularly the variable speed feed driving connections to the table, and portions of applicants' clutch shifting mechanism; Fig. 4 is a detail view in front elevation illustrating particularly the spring means for shifting the clutch shifting plunger to its inactive position and for removing the latch to permit the return of the feed-quick traverse clutch to the feed position; Fig. 5 is a detail sectional view taken on the line 5—5 of Fig. 2, illustrating particularly the table viscosity switch; Fig. 6 is a detail sectional view in front elevation, illustrating particularly the table driving connections in the base of the machine; Fig. 7 is a detail view taken on the section line 7—7 of Fig. 6, illustrating particularly the mechanism for easing off the backlash take-up device; Fig. 8 is an enlarged detail sectional view taken on the line 8—8 of Fig. 1, illustrating particularly the several table operating controls embodied within the table control panel; Fig. 9 is a sectional view looking from the front taken on the line 9—9 of Fig. 8; Fig. 10 is a sectional view taken on the line 10—10 of Fig. 8, looking from the left, and illustrating the several table control switches and certain of the manual and dog actuated control connections therefor; Fig. 11 is a fragmentary detail view of the manually operable stop plunger showing the plunger latch in stop position; Fig. 12 is a sectional view taken on the line 12—12 of Fig. 8, looking from the left; Fig. 13 is a detail view showing in full lines the switches illustrated in section in Fig. 10; Fig. 14 is a sectional view taken on the line 14—14 of Fig. 13, illustrating particularly the right operating control switch; Fig. 15 is a sectional plan view taken on the line 15—15 of Fig. 1; Fig. 16 is a sectional view in front elevation taken on the line 16—16 of Fig. 15, and showing particularly the table reversing switch; Fig. 17 is a perspective view of the stop latch block; Fig. 18 is a single line electrical wiring diagram for the machine; Fig. 19 is a complete line diagram of the electrical circuit; and Fig. 20 is a fragmentary view in front elevation of the milling machine showing particularly the relation of the base, work support, milling head and milling cutter spindle mounted thereon.

The invention is disclosed in the drawings as embodied in a milling machine having a base 20, a column 19, a milling head 21 which is vertically adjustable on the column and carries a milling cutter spindle 23 and a work supporting table 22 which is supported for sliding movement on ways 24 on the base 20. The table is arranged to be power operated from a reversible electric motor 26 which is mounted on the base and operates through appropriate feed and quick traverse driving connections including a feed-quick traverse clutch to drive the nut element of a feed screw and nut driving connection for traversing the table. The armature shaft 28 of the motor is connected by means of a sleeve coupling 30 with a main drive shaft 32. The table is driven from the shaft 32 at a feed rate through a feed driving train comprising a worm 34 on the shaft 32 which meshes with a worm wheel 36 on a forwardly extending countershaft 38. Thence the drive is taken by means of a pick-off gear 40 on the shaft 38, pick-off gears 42 and 44 on a countershaft 48 and a pick-off gear 46 on a driven shaft 50, to a worm 52 on the shaft 50 and a worm wheel 54. The worm wheel 54 is supported on and is keyed to one element of an overload friction clutch unit 62 which is supported on roller bearings on a supporting shaft 56, and carries thereon a clutch face 64 forming the feed driving element of the feed-quick traverse clutch.

For operation of the work table at a quick traverse rate, the drive is taken from the drive shaft 32 through a quick traverse gear train comprising a gear 66 on the shaft 32 and a gear 68 which is supported to turn on the supporting shaft 56 and forms the quick traverse driving element of the feed-quick traverse clutch. The gear 68 is formed integrally with a sleeve element 72 which is loose on the shaft 56 and is externally supported by means of roller bearings 73 carried on the base 20. In order to provide for an overload safety release in the quick traverse driving connections, the clutch toothed face 74 of the quick traverse driving element is formed on a sleeve member 75 which is connected through a multiple disk friction clutch to turn with the quick traverse gear 68.

The driven element of the feed-quick traverse clutch comprises a sleeve clutch member 76 interposed between the feed and quick traverse driving clutch faces 64 and 74 respectively, and arranged to be shifted axially into clutching engagement with one or other of said clutch faces 64 and 74. The sleeve member 76 is supported to rotate with relation to and to move axially with a sleeve element 78 which is slidably supported on and keyed to the supporting shaft 56. A spiral gear 80 formed on the external periphery of the driven sleeve clutch element 76 meshes with an idler gear 82 on a stub shaft 84, the idler 82 in turn meshing with a spiral gear 86 formed on a driving nut element 88 screw-threaded to a feed screw 90 for driving the table. The feed screw and nut driving connection of the present machine is of the general type in which the feed screw 90 is supported at one end in a depending lug 92 on the table to move axially therewith, and is further supported against rotational movement therein by a locking screw 94. The nut 88 is connected by means of meshing clutch teeth with a second nut 96 on the feed screw 90. The nuts 88 and 96 are supported against axial movement on the base 20 by means of two end thrust surfaces 98 and 100, the surface 98 being engaged by a roller bearing 102 which is seated against a check nut 104 on the nut 88. The end thrust surface 100 has formed thereon cam surfaces which cooperate with corresponding surfaces formed on a ring-shaped backlash take-up cam 106, the cam in turn being engaged by a roller bearing 108 which in turn engages against a check nut 110 on the sleeve nut 96.

As more fully illustrated in the application of Bennett and Jacobson, Serial No. 447,930 filed June 22, 1942, power operated mechanism is provided which is rendered operative through the agency of a solenoid to shift the feed-quick traverse clutch to the quick traverse position, and simultaneously to ease off the backlash take-up mechanism of the machine. The clutch shifting mechanism briefly comprises a control rod 112 which extends axially within the hollow supporting shaft 56, and is connected by means of a key 114 with the sleeve element 78 for controlling the lengthwise position of the shiftable driven element 76 of the feed-quick traverse clutch. The key 114 extends through a slot 116 in the supporting shaft 56. A compression spring 118 coiled about the shift rod 112 between a shoulder 120 formed on the inner periphery of the supporting shaft 56 and the shouldered end of an enlarged portion of the shift rod tends to move the shift rod 112 toward the right as shown in Fig. 6, to maintain the clutch normally in its feed position.

At its left hand end the shift rod 112 projects from the supporting shaft, and is provided with an abutting surface 122 for engagement with an adjustable stop screw 124 on a lever arm 126 forming part of the mechanism for easing off the take-up device for eliminating backlash in the feed screw and nut connections. The arm 126 is secured to a vertically disposed rock shaft 128 which carries adjacent its upper end an arm 130 connected with an arm 132 having a sleeve hub 134 fitted to turn on a horizontally disposed pivot shaft 136. A gear toothed sector 138 on the sleeve hub 134 is arranged for operative engagement with a toothed sector 140 formed on the backlash cam 106 (see Figs. 7 and 2). The construction and arrangement of these connections is such that movement of the control rod 112 to the left will act to shift the feed-quick traverse clutch to the quick traverse position, and at the same time through the engagement of the surface 122 with the stop screw 124 will act to rock the backlash cam 106 in a counterclockwise direction as viewed in Fig. 7, to ease off the take-up device. A spring-pressed plunger 142 engages against a notched arm 144 on the sleeve hub 134 to maintain the backlash cam 106 normally in its take-up position.

The clutch is shifted automatically from the feed to the quick traverse position by means of a solenoid 150 (see Fig. 2) and a power operated shifting device including a power driven cam and a follower element shifted by the solenoid into and out of operating engagement with the cam for shifting the same. The shifting mechanism comprises specifically a sleeve cam 152 (see Fig. 6) sleeved on the support shaft 56, and arranged to be continuously driven through the engagement of clutch teeth formed on one face of the sleeve cam and an abutting face of the traverse driving gear sleeve 72. The sleeve cam 152 is arranged for abutting engagement with a ball thrust bearing 156 interposed between the sleeve cam 152 and a sleeve element 158 secured to the control shaft 112. The cam 152 is arranged to be acted upon by means of a plunger type follower which takes the form of a roll 160 formed on a pivot shaft 162 rotatably supported in a vertically movable plunger sleeve 164. The position of the follower roll 160 and plunger sleeve 164 is controlled by means of a rock shaft 166 having a rib 168 formed therein for engagement with a transverse slot in the plunger sleeve 164. A horizontally extending lever arm 172 (see Fig. 2) secured to the rock shaft 166 is connected by means of a link 174 with the armature 176 of the solenoid 150. A spring-pressed plunger generally indicated at 180 (see Fig. 4) engages against a depending arm 182 on the rock shaft 166 to maintain the sleeve plunger 164 and follower 160 in a depressed inoperative position determined by the engagement of an adjustable stop screw 184 with an abutment on the lever arm 172. The solenoid 150 when energized, tends to rock the lever arm 172 and shaft 166 against the pressure of the spring plunger 180 to move the follower 160 and plunger sleeve 164 upwardly into operative engagement with the cam 152. Continued rotation of the cam under the influence of the continuously driven traverse driving clutch gear 68 and sleeve 72 acts to shift the cam 152 leftwardly, carrying with it the ball bearing 156, sleeve 158 and control shaft 112, thus causing the driven clutch element 76 of the feed-quick traverse clutch to be shifted into engagement with the quick traverse clutch face 74. At the same time the face 122 of the control rod 112 is brought into engagement with the adjustable screw 124, causing the backlash cam 106 to be rocked in a counterclockwise direction from the position shown in Fig. 7, against the pressure of the spring-pressed plunger 142 to ease off the take-up device. The several operating parts are now locked in their shifted position to maintain operation of the machine at a quick traverse rate by means of a latch 188 (see Fig. 6) pivoted at one end at 190 on the machine frame, and at its other end connected to a vertically arranged link 192, which at its lower end is connected with a lateral extension 194 of the sleeve plunger 164. A compression spring 196 coiled about the link 192 tends to maintain the latch 188 in its extended position. The latch 188 is provided with an upwardly extending nub 198 which is arranged for engagement in a notch 200 formed in the under side of the sleeve member 158 when the cam sleeve 152 has been moved to its quick traverse position. Upward movement of the follower roll 160 and plunger sleeve 164 to engage with and move the cam sleeve 152 to its quick traverse position causes the latch to be biased yieldingly upward so that the nub 198 will be moved into latching engagement with the notch 200. Downward movement of the follower 160 and sleeve plunger 164 to the inoperative position acts positively to withdraw the latch permitting the return of the clutch to be feed position and the re-engagement of the backlash take-up device.

In accordance with the invention, applicants provide a simplified and improved driving and control system for controlling the operation of the work supporting table, which includes a simplified arrangement of the electrical connections and a novel and improved arrangement of the manual and dog actuated control devices for rendering the electrical connections operative to control the operation of the work table in accordance with any one of a number of desired manual and automatic operating cycles. As will be evident from the electrical diagram Fig. 18, the table motor 26 is electrically connected to be driven in opposite directions by means of left and right relay operated switches designated at L and R respectively, individual electric circuits being provided for energizing each of the relays L and R. The feed-quick traverse solenoid 150 for shifting the feed-quick traverse clutch between feed and quick traverse positions, is energized by means of a third circuit which is in parallel with the circuits for energizing the table motor left and right switch relays L and R. For opening and closing the several circuits above noted to control the starting, stopping, direction and rate of travel of the work table, applicants provide a novel and improved arrangement of switches and manual and dog operated control elements therefor. The switches referred to, include principally an operating right control switch having quick traverse, feed right, and stop positions, an operating control left switch having quick traverse left, feed left and stop positions, and a directional control switch having alternative left and right positions for rendering either the left or right operating control switch operative to control the operation of the table motor and work support driven thereby. It will be noted also that a table viscosity switch is provided designated at 204 which is rendered operative to prevent the energizing of the quick traverse clutch solenoid 150 when the electrical connections to the motor are reversed from right to left until after the motor and work support driven thereby have been brought to a full stop. In this manner the table is prevented from jumping ahead at reversal through the premature shifting of the clutch to the quick traverse position.

The right and left operating control switches designated respectively at 212 and 214 in Fig. 18, and the reversing switch designated at 216 for controlling the several electrical circuits are carried on a switch control box 210 mounted on the base 20 adjacent the front side of the work supporting table 22. As best shown in Figs. 13 and 14, the right operating control switch 212 is in the form of a vertically arranged stem on which is supported a switch arm 218 spring-pressed upwardly in engagement with the stop right switch contacts 10—15, a switch arm 220 spring-pressed upwardly into engagement with stop right contacts 14—22, and a switch arm 222 spring-pressed upwardly into engagement with quick traverse right switch contacts 11—16. Upon downward movement of the switch plunger 212, the switch arms 218, 220 and 222 are arranged to be moved positively out of engagement with their respective switch contacts by means of shouldered sleeve portions 224, 226 and 228 respectively. It will be noted that the shoulders 224 and 226 are spaced from their respective switch arms 218, 220, a greater distance than is the case with the sleeve shoulder 28 with respect to the switch arm 222, so that movement of the switch plunger 212 downwardly to an intermediate position will have the effect of moving the switch arm 222 to open the switch contacts 11—16 without causing either of the switch arms 218, 220 to be moved to open position. The left operating control switch 214 similarly comprises a vertically arranged plunger on which are mounted switch arms 230, 232 and 234 which are arranged to control respectively stop left contacts 13—18 and 9—14 and the quick traverse contact 12—17. As best shown in Figs. 10 and 13, the construction and arrangement of the left control switch is identical with that of the right operating control switch, movement of the switch plunger 214 downwardly to an intermediate position acting to bring the shouldered sleeve portion 236 of the plunger (see Fig. 10) into engagement with the switch arm 234 to disengage the quick traverse left contact 12—17, continued movement of the switch plunger 214 downwardly to its extreme low position acting to engage shouldered sleeve portions 238, 240 respectively with switch arms 232, 230 to disengage the stop left contacts 13—18 and 9—14. The reversing switch 216 as best shown in Figs. 10 and 16, takes the form of a vertically arranged plunger having supported thereon switch arms 241, 242, 243 and 244, of which switch arms 241 and 242 are spring-pressed respectively into engagement with right contacts 9—10 and 9—11, and switch arms 243 and 244 are spring-pressed respectively into engagement with left contacts 9—12 and 9—13. The shouldered sleeve portions on the switch plunger 216 are so arranged that movement of the reversing switch plunger 216 to its raised position acts to engage the left switch arms 243, 244 and to disengage the right switch arms 241, 242, while downward movement of the switch plunger 216 to its low position acts to engage the right switch arms 241, 242 and to disengage the left switch arms 243, 244.

The viscosity switch 204 which is shown generally in Figs. 2 and 5, and diagrammatically in Fig. 18, comprises a pair of contact arms supported on a plunger 245 for movement between alternative positions in which contact 17—16 is closed or in which contact 9—18 is closed. The switch arm 245 is connected to the lower end of a lever arm 246 pivoted on the machine frame, and at its upper end connected to a strap member 247 which frictionally engages a cylindrical drum 248 keyed to the driving shaft 32 to turn with the motor armature 28. The drum 248 and strap 247 are arranged to dip into an oil bath provided by a container 249. During operation of the motor 26, the strap 247, lever arm 246 and switch plunger 245 are biased in one direction or the other depending upon the direction of rotation of the motor armature 28 and shaft 32. During travel of the table to the right, the parts will be biased in a direction to maintain the contact 9—18 closed and the contact 17—16 open. Upon the shifting of the reversing switch from right to left, right contacts 9—10 and 9—11 open, and contacts 9—12 and 9—13 close. However, the quick traverse solenoid will not be energized until after the viscosity switch shifts to open contact 9—18 and to close contact 17—16. This reversal in the position of the viscosity switch does not take place until the motor has been actually brought to a stop and starts to rotate in the opposite direction.

The reversing switch 216 is arranged to be shifted between alternative feed right and feed left positions by means of mechanically operated connections which include a manually operable start left button 250, a manually operable start right button 252 and two vertically arranged left and right dog actuated reversing plungers designated at 254 and 256 respectively, in Figs. 9, 12, 15 and 16. The reversing switch 216 has the stem portion thereof connected to the lower end of the vertically movable reversing plunger 254 (Fig. 10), so that downward movement of the plunger 254 will cause the switch to be moved to the start left position, and upward movement of the plunger carrying with it the switch stem 216 will shift the reversing switch to the start right position. The reversing plungers 254 and 256 are connected to one another so that movement of either in a downward direction causes the other to move upward. As best shown in Figs. 8, 15 and 16, a cross lever arm 258 is loosely sleeved to turn on a shaft 260 forming part of the manually operable stop control hereinafter more fully to be described, and is provided at its opposite ends with follower rolls 262, 264 which engage in annular grooves 266, 268 respectively in the reversing plungers 254, 256. The reversing switch mechanism including the reversing switch 216 and plungers 254, 256 are arranged to be held frictionally in adjusted position by means of a friction block 269 (Fig. 10) slidably mounted in a recess 270 and frictionally engaged with the plunger 254 by means of a compression spring 271 seated in the base of the recess.

The start left button 250 is arranged to operate when pressed inwardly to force the reversing plunger 254 and reversing switch 216 connected therewith, downwardly to the start left position through connections which comprise (see Figs. 8, 9 and 10), a rearwardly extending stem 272 which is loosely sleeved at its forward end within the start left button 250, and at its rear end is journalled to slide in a stationary bearing 274. An annular groove 276 formed in the stem 272 is arranged to receive a follower roll 278 on a bell-crank lever 280, the other arm of which carries the follower roll 282 for engagement with the annular groove 266 in the reverse left plunger 254. The bell-crank 280 is sleeved to turn on a pivot pin 284 supported within the control box.

The start right button when pressed inwardly acts through connections similar to those previously described in connection with the start left button, to move the reversing plunger 256 downwardly, thereby moving the reversing plunger 254 and reversing switch 216 upwardly to the start right position. These connections as best shown in Figs. 8, 9 and 12, comprise a rearwardly extending stem 286 loosely sleeved within a recess formed in the start right button 252, and at its rear end supported to slide in a bearing 288 on the control box. An annular groove 290 formed in the stem 286 is arranged to receive a follower roll 292 on a bell-crank lever 294, the other arm of which carries a follower roll 296 for engagement with the annular groove 268 in the reversing plunger 256. The bell-crank 294 is supported to turn on a transverse pivot pin 298 supported on the machine frame.

The right operating control switch 212 as best shown in Fig. 10, has the stem portion thereof arranged to be engaged against the lower end of a dog actuated plunger 300 which at its upper end carries a follower roll 302 for engagement with associated operating dogs on the work table 22 of the machine. A compression spring 304 coiled about the plunger 300 between a collar 306 loosely sleeved on the plunger for engagement with an abutment on the machine frame, and a shouldered portion 308 tends to move the plunger upwardly to the quick traverse position of the operating right switch. The stem portion of the switch 212 is maintained in engagement with the plunger 300 by the action of the compression spring 310 seated beneath and engaging the lower end of the stem portion of the right operating control switch 212.

The left operating control switch 214 is arranged to be controlled by means of a dog actuated left operating control plunger 312 which is offset from the upper end of the left operating control switch 214, but is connected therewith by means of a plunger 314 axially in alignment with and engaging the upper end of the stem portion of the left operating control switch 214, and a laterally extending link 316 which connects the plungers 312 and 314 rigidly to move as a single unit. The plunger 312 as best shown in Fig. 12, is moved yieldingly upwardly to the quick traverse position of the plunger by means of a coiled compression spring 318 seated in a recess formed in the lower end of the plunger and against the bottom of a socket support 320 for the plunger 312. A compression spring 322 seated against the lower end of the stem portion of the left operating control switch 214 tends to maintain the stem portion thereof in engagement with the plunger 314.

For operation of the machine in accordance with an automatic or semi-automatic cycle of operation, table dogs are provided which are supported in a T-shaped slot 324 formed in the front side of the work supporting table, these dogs being supported in such a manner as to operate in three individual paths, the dogs supported for movement in one of said paths being arranged for engagement with the right operating switch control plunger 300 as shown in Fig. 10, the dogs operating in the second path being arranged to act on the left operating control switch plunger 312, and the dogs in the third path being arranged to act on the reversing plungers 254, 256 as shown in dot-and-dash lines in Fig. 12. The left and right operating switch control plungers are arranged to be operated upon by feed dogs such as that designated at 326 in Fig. 1, and stop dogs such as that indicated at 328 in Fig. 1. The reversing plungers 254, 256 are arranged to be acted upon by reversing dogs such as that indicated at 329 in Fig. 1.

In accordance with a feature of the present invention, it is proposed to control the operation of the electrical operating connections of the machine to cause the work support to travel alternatively at a feed or quick traverse rate, and to stop at either end of its travel when so desired, through the operation of dogs which are particularly constructed and arranged to maintain a predetermined operating condition of the electrical connections throughout the period of operation. To this end the feed dog 326 which depresses the right operating control switch plunger to its intermediate feed position is constructed of a length equal to the distance which it is required to move the table at the feed rate, so that the plunger is maintained continuously in engagement with and is controlled by the dog during the entire period of feed. At the end of the movement of the table in either direction when it is desired to stop the table, the operating control switch plunger corresponding to the direction in which the table is moving is arranged to be engaged by a stop dog which depresses the plunger to its fully retracted stop position. Inasmuch as the stopping of the table causes the stop dog to come to rest over the plunger, the dog acts positively to hold the plunger in its fully depressed stop position until the machine is again started by the pressing of the start button to start the machine in the opposite direction.

Further in accordance with the invention, applicants provide a manually operable start and stop control knob 334 and a manually operable feed-quick traverse control knob 336 on the table control box of the machine for manually controlling the left and right operating control switches 212, 214. As best shown in Figs. 8, 12 and 15, the feed-quick traverse control knob 336 is mounted on the forward end of an axially movable plunger 340 which is slidably supported in bearings in the control box, and is provided at its rear end with a collar 342 which carries a pin 344 for engagement in a bore 346, and serves to key the plunger 340 against rotational movement. A detent pawl 348 spring-pressed against the under side of the plunger 340 by a spring 350 is arranged for the extended quick traverse position of the control knob 336 and plunger 340 to engage in a V-shaped annular groove 352 to latch the plunger in this position.

Further in accordance with the invention, the feed-quick traverse control knob 336 is arranged to effect a simultaneous shift in the position of both the right and left operating control switches 212, 214, so that table operation will be at the desired rate for either direction of travel of the table. The mechanism through which axial movement of the manually operable control knob 336 and plunger 340 is rendered operative to control the position of the switches 212, 214, comprises a frame lever 354 consisting of a sleeve element supported to turn on a transversely extending pivot shaft 356, and having formed thereon a rearwardly extending arm 358 which carries a pin 360 for engagement with a cammed surface on the upper side of the plunger 340. This cam surface comprises a low level flat 362, a rise surface 364 and a high level flat 366. Also formed on the sleeve hub 354 of the frame lever are two forwardly extending arms 368, 370 which provide support for a horizontally extending actuating pin 372 which engages respectively in a notch 374 formed in the forward side of the switch actuating right plunger 300 (see Fig. 10), and in a notch 376 formed in the rear side of switch left control plunger 312 (see Fig. 12). Each of the notches 374, 376 are of sufficient length to permit freedom of movement of each of the plungers 300, 312 downwardly under the influence of the respective operating dogs irrespective of the position of the feed-quick traverse control knob 336, plunger 340 and associated frame lever including the actuating rod 372.

With the construction and arrangement of the manually operable feed-quick traverse control knob 336 and the associated connections above outlined, it will readily be seen that when the control knob 336 is in its pulled-out or extended quick traverse position, the follower pin 360 will be engaged with the lower flat 362 on the plunger 340, and the actuating pin 372 of the frame lever will be in its raised position, so that the control plungers 300, 312 and the right and left operating control switches 212, 214 are in their raised quick traverse position. Movement of the feed-quick traverse knob 336 rearwardly will cause the follower pin 360 to move onto the upper flat 366 to rock the frame lever 354 and to move the actuating pin 372 and operating plungers 300, 312 downwardly to the feed position.

The start and stop control knob 334 of the machine (see Figs. 8, 10, 11 and 15) is secured to the forward end of an axially movable plunger 260. The enlarged forward end of the plunger 260 is slidably supported in a bearing 378, the rear end of the plunger being slidably supported in a bearing 380 in the rear wall of the control box. In order to prevent rotational movement of the plunger, a collar 382 secured to the rear end thereof has mounted thereon a pin 384 for engagement in a bore 386 adjacent and parallel to the bearing 380.

The stop control knob 334 and plunger 260 act when rendered operative to stop the machine through connections which act to shift the left and right operating control switches 212, 214 to their fully depressed stop position. The connections through which this operation is effected comprise the frame lever 354 above described, which is provided, as best shown in Figs. 10 and 15, with a downwardly extending arm 388 having formed therein a follower roll 390 for engagement in a recess 392 in the side of the plunger 260. It will readily be seen that movement of the stop control knob 334 and plunger 260 to a fully retracted or depressed position will act to rock the frame lever 354 to carry the actuating pin 372 and plungers 300, 312 downwardly to their fully depressed position in which the left and right operating control switch 212, 214 are in their fully depressed stop positions.

Further in accordance with the present invention, a latch mechanism is provided which is rendered operative by the pushing of the stop button 334 to its fully retracted position to latch the stop button and the right and left operating control switches controlled thereby in their stop position. The latch mechanism for latching the parts in stop position is further constructed and arranged to move both the start left and start right buttons to an extended position, but without disturbing the position of the reversing switch 216. When the operator subsequently presses one or the other of these start buttons to start the machine in the desired direction, the stop latch is automatically released, permitting the left and right operating control plungers 300, 312 and switches 212, 214 to move away from their stop position to either the feed or quick traverse position in accordance with the setting of the feed-quick traverse control button and the table dogs.

As best shown in Figs. 8 to 11 inclusive, and in Fig. 17, the stop latch mechanism comprises a latch block 396 which is supported for a forward and back swinging movement on two pivot pins 398 of reduced size formed on the ends of pins 284 and 298 respectively, and located one at either side of the plunger 260. The latch block is provided with a cut-away portion 400 to permit the latch block to straddle the plunger 260, and at its forward end has two inwardly extending ears 402 which normally engage upon flat shouldered edges 404 formed by cut-outs in the plunger 260, and are arranged when the stop control knob 334 and plunger 260 are pushed to their extreme rearward stop position to drop behind stop surfaces 406 of the plunger 260. The latch block 396 is urged in a clockwise direction to the position shown in Fig. 11, by means of a compression spring 408 seated at its rear end in a recess in the machine frame, and at its forward end in a plunger sleeve 410 which bears against a cross pin 412 journalled in the forked upper end of the latch block 396. The pin 412 is arranged so that the outer ends thereof extend into the path of movement of the start left and start right buttons 250, 252 respectively. During normal operation of the machine, the ears 402 are engaged against the flats 404 on the plunger 260 so that the latch block 396 is supported positively in a retracted inoperative position against the pressure of the spring-pressed plunger 410. Movement of the stop control knob 334 to the stop position, however, permits the ears 402 to drop against the latch surfaces 406 to lock the parts in their stop position, and at the same time causes the cross pin 412 to be moved forwardly to engage one of the start left and start right buttons 250, 252 which is in its rearward position, and causes both these buttons to be moved to a forwardly extended inoperative position. When it is desired to start the machine, the pressing of either the start left or start right button will act to force the latch block 396 rearwardly and upwardly against the pressure of the spring-pressed plunger 410 to release the latch and permit movement of the left and right operating control switches 212, 214 to their operative feed or quick traverse positions as determined by the setting of the several dog and manually operated controls.

It will be understood that the invention is not limited to the specific embodiment shown, and that various deviations may be made therefrom without departing from the spirit and scope of the appended claims.

What is claimed is:

1. In a machine tool having a movable support, a driving and control mechanism for said support comprising a reversible electric motor and driving connections therefrom including a feed-quick traverse clutch and electrically operated means for controlling said motor and clutch including a dog actuated element for controlling said clutch shiftable between feed and quick traverse positions, means acting yieldably to maintain said control element in the quick traverse position, and a dog arranged to cooperate with said operating control element of a length measured by the distance to be travelled by the support at the feed rate for maintaining the dog positively in the feed position against the pressure of said yieldable means.

2. In a machine tool having a movable support, a driving and control mechanism comprising power means for driving the support reversibly in either direction and including means for driving the support selectively at alternative feed and quick traverse rates, electrical switch connections controlling the starting, stopping, direction and rate of travel of the support, and mechanically operable means for actuating said switch connections comprising a dog actuated travel right control plunger having raised quick traverse, intermediate feed, and depressed stop positions, a dog actuated left control plunger having raised quick traverse, intermediate feed, and depressed stop positions, a pair of dog actuated directional starting control plungers alternately actuable to start support movement in the selected direction and under the control of the selected operating control plunger, a manually operable feed-quick traverse control element connected to shift both of said control plungers from quick traverse to the feed position, a manually operable stop control element connected to shift both of said control plungers to the stop position, manually operable directional control elements for shifting said directional starting control plungers between said alternate positions, and a latch device operative to latch the control plungers in stop position and arranged to be released by actuation of said directional starting controls to start support movement.

3. In a machine tool having a movable support, a driving and control mechanism comprising power means for driving the support reversibly in either direction and including means for driving the support selectively at alternative feed and quick traverse rates, electrical switch connections controlling the starting, stopping, direction and rate of travel of the support, and mechanically operable means for actuating said switch connections comprising a dog actuated travel right control plunger having raised quick traverse, intermediate feed, and depressed stop positions, a dog actuated travel left control plunger having raised quick traverse, intermediate feed, and depressed stop positions, spring means for supporting each of said right and left control plungers in the raised quick traverse position, a pair of dog actuated starting control plungers connected for alternate actuation to start support movement in the selected direction, a manually operable feed-quick traverse control element and a connection actuated thereby for depressing both the left and right control plungers to the intermediate feed position, a manually operable stop control element connected to depress both the right and left control plungers to the stop position, manually operable start right and start left elements, and means responsive to the actuation of one of said start elements to cause the stop control element to be moved from stop position.

4. In a machine tool having a movable support, a driving and control mechanism comprising power means for driving the support reversibly in either direction and including means for driving the support selectively at alternative feed and quick traverse rates, electrical switch connections for controlling the starting, stopping, rate and direction of travel of the support, and mechanical operating means for said switch connections comprising a manually operable feed-quick traverse control, a manually operable stop control including means to bias said latter control to the start position, manually operable directional starting controls, and a latch device operative to latch the stop control in stop position and arranged to be released by actuation of said directional starting controls to start support movement.

5. In a machine tool having a movable support, a driving and control mechanism comprising power means for driving the support reversibly in either direction, and control means for controlling the starting, stopping and direction of travel of the support including a stop control element manually shiftable from a running to a stop position, means for moving said element yieldingly from stop to running position, a left and a right starting control element manually operable to start support movement in a selected direction, a latch arranged to be engaged with said stop control element to latch the same in stop position and arranged to be engaged with and released by said left and right starting control element upon actuation thereof to start support movement.

6. In a machine tool having a movable support, a driving and control mechanism comprising power means for driving the support reversibly in either direction, and control means for controlling the starting, stopping and direction of travel of the support including a stop control plunger manually shiftable from running to stop position, means tending to move said plunger yieldably from stop to running position, left and right starting control elements manually operable to start support movement in the selected direction, a latch block pivotally supported for movement into latching engagement with the stop control element to latch the same in stop position, and means tending to move the latch yieldably to the stop position, said latch and starting control elements being constructed and arranged so that movement of the latch to the stop position causes the latch to engage with and move both of said left and right starting control elements to an extended inoperative position, and subsequent actuation of one of said control elements is effective to trip the latch.

7. In a machine tool having a movable support, driving and control mechanism for said support comprising power means for driving the support reversibly in either direction, and including means for driving the support selectively at feed and quick traverse rates, a dog actuated control element for controlling the rate of support movement shiftable between an extended quick traverse and retracted feed position, a dog engaging follower roll on the control element, means acting yieldably to maintain the control element in the extended quick traverse position, and a dog having an engaging surface of a length measured by the distance to be travelled by the support at the feed rate for engagement with the follower roll to maintain the control element positively in the feed position against the pressure of said yielding means.

8. In a machine tool having a movable support, driving and control mechanism for said support comprising power means for driving the support reversibly in either direction, and including means for driving the support selectively at feed and quick traverse rates, a dog actuated control element for controlling the rate of support movement shiftable between an extended quick traverse and a retracted feed position, means acting yieldingly to maintain the control element in the extending quick traverse position, and a dog having an engaging surface of a length measured by the distance to be travelled by the support at the feed rate for maintaining the control element positively in the feed position against the pressure of said yieldable means.

9. In a milling machine having a milling cutter spindle and a support movable to effect relative translatory movement of the work and the cutter spindle, a driving and control mechanism for said support comprising a reversible electric motor and driving connections therefrom including a feed-quick traverse clutch, electric power connections to the motor including switch connections shiftable to stop and to start the motor in alternative support right and support left directions, an electrical control system for the support including a support right control circuit including a motor switch actuating relay, a support left control circuit including a motor switch actuating relay, a clutch control circuit including a clutch shifting solenoid, and control switches in said circuits to control support movement including a support travel left operating switch having alternative quick traverse left, feed left and stop positions, a support travel right operating switch having alternative quick traverse right, feed right and stop positions, and a directional control switch in said circuits shiftable to render said support travel left and right operating switches alternatively operative to control support movement.

10. In a milling machine having a milling cutter spindle and a support movable to effect relative translatory movement of the work and the cutter spindle, a driving and control mechanism for said support comprising a reversible electric motor and driving connections therefrom including a feed-quick traverse clutch, electric power connections to the motor including switch connections shiftable to stop and to start the motor in alternative support right and support left directions, an electrical control system for the support including a support right control circuit including a motor switch actuating relay, a support left control circuit including a motor switch actuating relay, a clutch control circuit including a clutch shifting solenoid, and control switches in said circuits including support travel left and right operating switches each having extended quick traverse, intermediate feed and retracted stop positions with contactors arranged for the intermediate position of either control switch to close the respective feed circuit and for the quick traverse position thereof to close additionally the feed-quick traverse control circuit, and a directional control switch having contactors in said left and right control circuits arranged for different positions of said directional control switch to disable alternatively the right and the left control circuit.

11. In a milling machine having a milling cutter spindle and a support movable to effect relative translatory movement of the work and the cutter spindle, a driving and control mechanism for said support comprising a reversible electric motor and driving connections therefrom including a feed-quick traverse clutch, electric power connections to the motor including switch connections shiftable to stop and to start the motor in alternative support right and support left directions, an electrical control system for the support including a support right control circuit including a motor switch actuating relay, a support left control circuit including a motor switch actuating relay, a clutch control circuit including a clutch shifting solenoid, and control switches in said circuits to control support movement including a support travel left operating switch with contactors in each of said support left and clutch control circuits to provide alternative quick traverse left, feed left and stop switch positions of the switch, a support travel right operating switch with contactors in each of said support right and clutch control circuits to provide alternative quick traverse right, feed right and stop switch positions of the switch, and a directional control switch with contactors in each of said circuits to provide alternative directional switch positions of the switch in which the support right and support left operating switches are alternatively operative to control support movement.

12. In a milling machine having a milling cutter spindle and a support movable to effect relative translatory movement of the work and the cutter spindle, a driving and control mechanism for said support comprising a reversible electric motor and driving connections therefrom including a feed-quick traverse clutch, electric power connections to the motor including switch connections shiftable to stop and to start the motor in alternative support right and support left directions, an electrical control system for the support including a support right control circuit including a motor switch actuating relay, a support left control circuit including a motor switch actuating relay, a clutch control circuit including a clutch shifting solenoid, control switches in said circuits to control support movement including a support travel left operating switch having alternative quick traverse left, feed left and stop positions, a support travel right operating switch having alternative quick traverse right, feed right and stop positions, and a directional control switch in said circuits shiftable to render said support travel left and right operating switches alternatively operative to control support movement, and operating means for said control switches including dogs on the support and alternatively available manual controls.

13. In a milling machine having a milling cutter spindle and a support movable to effect relative translatory movement of the work and the cutter spindle, a driving and control mechanism for said support comprising a reversible electric motor and driving connections therefrom including a feed-quick traverse clutch, electric power connections to the motor including switch connections shiftable to stop and to start the motor in alternative support right and support left directions, an electrical control system for the support including a support right control circuit including a motor switch actuating relay, a support left control circuit including a motor switch actuating relay, a clutch control circuit including a clutch shifting solenoid, control switches in said circuits to control support movement including a travel left operating switch having an extended quick traverse, an intermediate feed and a retracted stop position, a support travel right operating switch having an extended quick traverse, an intermediate feed and a retracted stop position, spring means urging each of said control switches to the extended position, a directional control switch acting on said circuits to render the left and right operating switches alternatively operative to control support movement, and operating means for said control switches including alternately movable plungers for shifting the directional switch from one to the other position, and switch control dogs on the movable support including a feed dog constructed and arranged to act upon and support one of said control switches in the feed position against the pressure of said spring means continuously for the distance to be travelled by the support at the feed rate.

14. In a milling machine having a milling cutter spindle and a support movable to effect relative translatory movements of the cutter spindle and work, driving and control mechanism for said support including power driving means operable to drive the support alternatively at feed and quick traverse rates, electrical operating means comprising switch connections shiftable to stop and to start support movement in alternative directions, and means including a control device shiftable for effecting support movement at alternative feed and quick traverse rates, and an electrical control system for the support comprising a control circuit including a switch actuating relay for starting support movement in one direction, a second control circuit including a switch actuating relay for starting support movement in the opposite direction, a control circuit including a solenoid for shifting said feed-quick traverse control device, and control switches in said circuits to control support movement including a support travel left operating switch having an extended quick traverse, an intermediate feed and a retracted stop position, a support travel right operating switch having an extended quick traverse, an intermediate feed and a retracted stop position, and a directional control switch shiftable to render said support travel left and travel right operating switches alternatively operative to control support movement.

15. In a milling machine having a milling cutter spindle and a support movable to effect relative translatory movements of the cutter spindle and work, driving and control mechanism for said supporting including power driving means operable to drive the support alternatively at feed and quick traverse rates, electrical operating means comprising switch connections shiftable to stop and to start support movement in alternative directions, means including a control device shiftable for effecting support movement at alternative feed and quick traverse rates, an electrical control system for the support comprising a control circuit including a switch actuating relay for starting support movement in one direction, a second control circuit including a switch actuating relay for starting support movement in the opposite direction, a control circuit including a solenoid for shifting said feed-quick traverse control device, and control switches in said circuits to control support movement including a support travel left operating switch having an extended quick traverse, an intermediate feed and a retracted stop position, a support travel right operating switch having an extended quick traverse, an intermediate feed and a retracted stop position, a directional control switch shiftable to render said support travel left and travel right operating switches alternatively operative to control support movement, a manual feed-quick traverse control shiftable to move the left and right operating switches simultaneously from one to the other of said feed and quick traverse positions, a manual directional control for shifting said directional control switch, and a manual stop control shiftable to move the left and right operating switches simultaneously to the stop position.

16. In a milling machine having a milling cutter spindle and a support movable to effect relative translatory movements of the cutter spindle and work, driving and control mechanism for said support including power driving means operable to drive the support alternatively at feed and quick traverse rates, electrical operating means comprising switch connections shiftable to stop and to start support movement in alternative directions, means including a control device shiftable for effecting support movement at alternative feed and quick traverse rates, an electrical control system for the support comprising a control circuit including a switch actuating relay for starting support movement in one direction, a second control circuit including a switch actuating relay for starting support movement in the opposite direction, a control circuit including a solenoid for shifting said feed-quick traverse control device, and control switches in said circuits to control support movement including a support travel left operating switch having an extended quick traverse, an intermediate feed and a retracted stop position, a support travel right operating switch having an extended quick traverse, an intermediate feed and a retracted stop position, a directional control switch shiftable to render said support travel left and travel right operating switches alternatively operative to control support movement, a manual feed-quick traverse control shiftable to move the left and right operating switches simultaneously from one to the other of said feed and quick traverse positions, a manual directional control for shifting said directional control switch, a manual stop control shiftable to move the left and right operating switches simultaneously to the stop position, and dogs responsive to the movement of the support for retracting either operating control switch independently of the other and independently of said manual controls to the feed and stop positions.

17. In a milling machine having a milling cutter spindle and a support movable to effect relative translatory movement of the cutter spindle and work, a driving and control mechanism for said support comprising a reversible electric motor and driving connections therefrom including a feed-quick traverse clutch, electric power connections to the motor including switch connections shiftable to stop and start the motor in alternative support right and support left directions, an electrical control system for the support including a support right control circuit and a support left control circuit for shifting said motor switch connections, and a control circuit for shifting the clutch between feed and quick traverse positions, and control switches in said circuits to control support movement including a support travel operating switch having an extended quick traverse and a less extended feed position, means acting yieldably to maintain the control switch in the extended position, and a dog arranged to cooperate with said control switch of a length measured by the distance to be travelled by the support at the feed rate for maintaining the control switch in the feed position against the pressure of said yieldable means.

18. In a milling machine having a translatable support, driving connections for driving the support reversibly in either direction at alternative feed and quick traverse rates, and electrical means including electrical control circuits having switch connections therein for controlling the starting, stopping, direction and rate of travel of the support, the combination of a support control assembly which comprises a support left operating switch element having contactors in said circuits providing extended quick traverse, intermediate feed and retracted stop positions of said switch element, a support right operating switch element having contactors in said circuits providing extended quick traverse, intermediate feed and retracted stop positions of said switch element, means urging each of said switch elements yieldably to the quick traverse position, a directional control switch element having contactors in said circuits arranged for different positions of said directional control element to disable alternatively one or the other of said circuits for effecting right and left movement of said support, right and left control plungers connected for movement with the respective switch elements, right and left directional control plungers connected for shifting the directional switch element between alternate positions, a manual feed-quick traverse control arranged for simultaneously depressing the left and right control plungers from the quick traverse to the feed position, a manually operable stop control operable to move the right and left control plungers simultaneously to the stop position, latching means for retaining said right and left control plungers in stop position, dogs rendered operative by movement of the support for moving said plungers selectively to the feed and stop positions, and manually operable directional controls arranged when actuated to release said latching means.

19. In a milling machine having a translatable support, driving connections for driving the support reversibly in either direction at alternative feed and quick traverse rates, and electrical means including electrical control circuits having switch connections therein for controlling the starting, stopping, direction and rate of travel of the support, the combination of a support control assembly which comprises a support left operating switch element having contactors in said circuits providing extended quick traverse, intermediate feed and retracted stop positions of said switch element, a support right operating switch element having contactors in said circuits providing extended quick traverse, intermediate feed and retracted stop positions of said switch element, means urging each of said switch elements yieldably to the quick traverse position, a directional control switch element having contactors in said circuits arranged for different positions of said directional control element to disable alternatively one or the other of said circuits for effecting right and left movement of said support, right and left control plungers connected for movement with the respective switch elements, right and left directional control plungers connected for shifting the directional switch element between alternate positions, control dogs rendered operative by movement of the support and arranged with relation to the right and left control plungers for selectively actuating said plungers to stop support movement, and a manually operable directional control shiftable to start support movement in accordance with the position of the other of said right and left control plungers.

20. In a milling machine having a translatable support, driving connections for driving the support reversibly in either direction at alternative feed and quick traverse rates, and electrical means including electrical control circuits having switch connections therein for controlling the starting, stopping, direction and rate of travel of the support, the combination of a support control assembly which comprises a support left operating switch element having contactors in said circuits providing extended quick traverse, intermediate feed and retracted stop positions of said switch element, a support right operating switch element having contactors in said circuits providing extended quick traverse, intermediate feed and retracted stop positions of said switch element, means urging each of said switch elements yieldably to the quick traverse position, a directional control switch element having contactors in said circuits arranged for different positions of said directional control element to disable alternatively one or the other of said circuits for effecting right and left movement of said support, right and left control plungers connected for movement with the respective switch elements, right and left directional control plungers connected for shifting the directional switch element between alternate positions, a manual feed-quick traverse control arranged for simultaneously depressing the left and right control plungers from the quick traverse to the feed position, a manually operable stop control operable to move the right and left control plungers simultaneously to the stop position, and dogs carried on the support and arranged for selectively actuating said right and left control plungers and said right and left directional control plungers to control automatically the direction, rate and stopping of the support.

ARTHUR F. BENNETT.
AUGUST L. KRAUSE.
HUGO W. JACOBSON.